United States Patent [19]

Meaden

[11] Patent Number: 4,642,793
[45] Date of Patent: Feb. 10, 1987

[54] MANY-TO-ONE MAPPING HASH ADDRESS GENERATOR

[75] Inventor: Dan F. Meaden, Stevenage, England

[73] Assignee: International Computers Limited, London, England

[21] Appl. No.: 590,786

[22] Filed: Mar. 19, 1984

[30] Foreign Application Priority Data

Mar. 24, 1983 [GB] United Kingdom ............... 8308148

[51] Int. Cl.⁴ .......................................... G06F 12/00
[52] U.S. Cl. .................................................. 364/900
[58] Field of Search ... 364/200 MS File, 900 MS File; 178/22.05, 22.06, 22.12–22.17, 22.07

[56] References Cited

U.S. PATENT DOCUMENTS

| | | | |
|---|---|---|---|
| 4,160,120 | 7/1979 | Barnes | 178/22.07 |
| 4,215,402 | 7/1980 | Mitchell et al. | 364/200 |
| 4,380,797 | 4/1983 | Desyllas et al. | 364/200 |
| 4,464,713 | 8/1984 | Benhase et al. | 364/200 |
| 4,538,240 | 8/1985 | Carter et al. | 364/754 |

FOREIGN PATENT DOCUMENTS 1491706 11/1977 United Kingdom .
1564563  4/1980 United Kingdom .

Primary Examiner—James D. Thomas
Assistant Examiner—Florin Munteanu
Attorney, Agent, or Firm—Lee, Smith & Zickert

[57] ABSTRACT

A data transformation circuit transforms an input data value into an output value according to a many-to-one mapping scheme by utilizing a hash coding circuit (30) which combines the input data value with a hashing key and a feedback signal. The hashing key is selectively variable and the output of the hash coding circuit is distributed in a selectively variable manner into one of a number of sections of a register (31) to enable the transformation to be modified in a flexible manner.

2 Claims, 2 Drawing Figures

MANY-TO-ONE MAPPING HASH ADDRESS GENERATOR

BACKGROUND TO THE INVENTION

This invention relates to data transformation circuits for transforming an input data value into an output value according to a many-to-one mapping scheme (i.e. such that the same output value may be derived from two or more different input values). Various data transformation methods are described in "Key-to-address transform techniques" by V. Y. Lum, Communications of the ACM, April 1971, page 228.

Such a transformation circuit may be used in an information storage system, for transforming an input data value into a storage address. One such application is described in British Patent Specifications Nos. 1,491,706 and 1,564,563, in which an input data item is hash-coded to produce addresses for a plurality of bit-wide stores, referred to as bit maps. The addressed bits of the bit maps may be set so as to tag the input data item, or alternatively the addressed bits may be read out and combined in an AND gate to determine whether the data item has previously been tagged.

The advantage of using a many-to-one mapping scheme in such a system is that it enables a large but sparsely populated address range to be effectively compressed into a much smaller range, thus reducing the size of the bit maps. However, as explained in those specifications, one problem with such a scheme is that the bit maps may occasionally produce spurious outputs, indicating that a data item has been tagged when in fact it has not. The number of spurious outputs may be reduced for any particular set of data items under consideration, by suitable choice of the transformation. Thus, if a first choice of transformation results in an unacceptably high number of spurious outputs, the hash coder may be modified to produce a different transformation which gives a lower number of spurious outputs.

One object of the present invention is to provide a novel data transformation circuit in which the transformation can readily be modified in a flexible manner.

SUMMARY OF THE INVENTION

According to the invention, there is provided a data transformation circuit for transforming an input data value into an output value according to a many-to-one mapping scheme, comprising
- a hashing circuit for combining the input value with a selectively variable hashing key,
- a result register having a plurality of sections, and
- a distributor circuit for distributing each output of the hashing circuit in a selectively variable manner into one of the sections of the result register.

Thus, it can be seen that the transformation can be varied either by changing the hashing key, or changing the operation of the switching means, or by a combination of these. This gives considerable flexibility and allows the transformation to be readily varied.

BRIEF DESCRIPTION OF THE DRAWINGS

One embodiment of the invention will be described by way of example with reference to the accompanying drawings of which.

DESCRIPTION OF AN EMBODIMENT OF THE INVENTION

Figure 1:
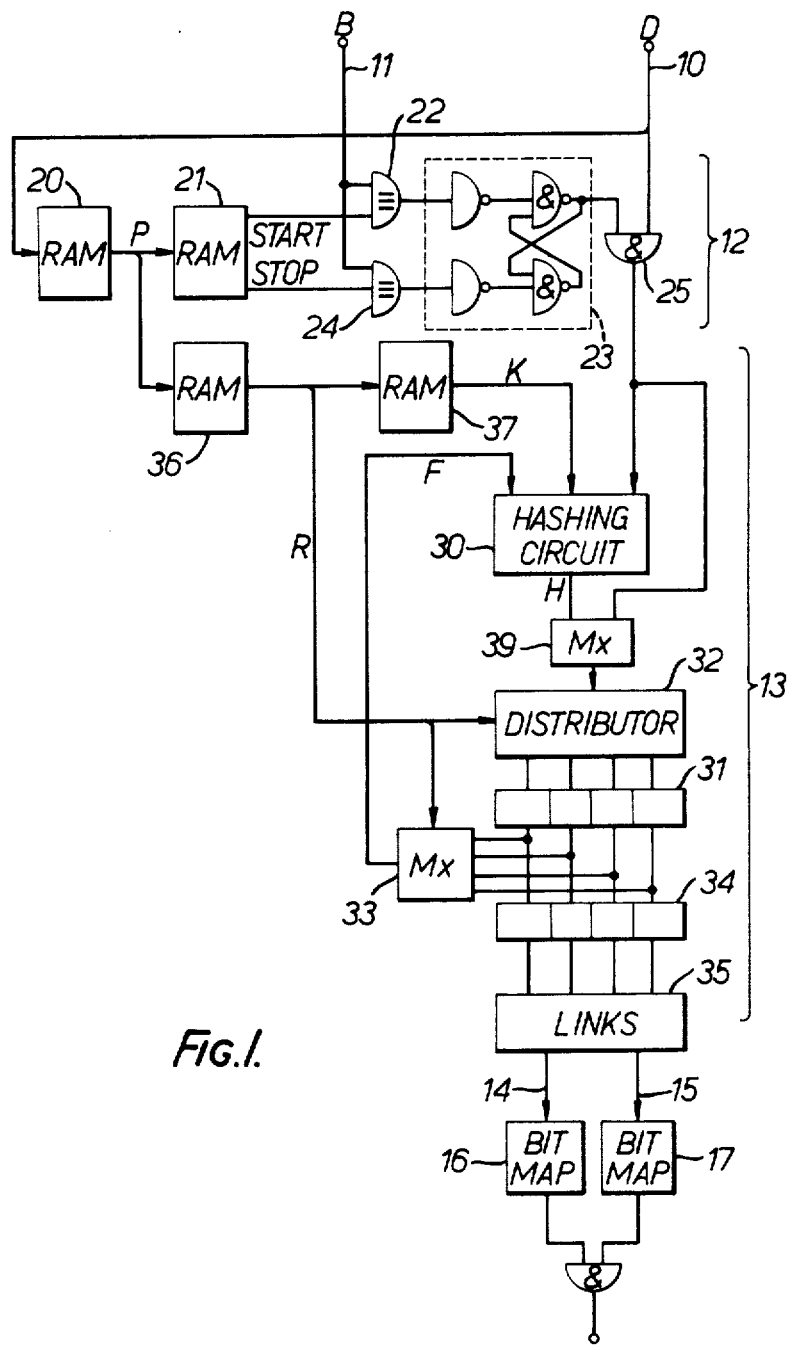
FIG. 1 is a block circuit diagram of an information storage arrangement incorporating a data transformation circuit in accordance with the invention.

Referring to FIG. 1, the information storage arrangement receives input data D on an 8-bit wide data input path 10, in the form of a series of 8-bit bytes. The data consists of a sequence of records, each record containing one or more data fields. Each field consists of a string of bytes. The first byte in each field is an identifier I which specified the nature or type of the data field. The second byte is a length byte L which represents the total length of the field in bytes (including the identifier and length byte). The remaining bytes in the field represent the value of a data item.

Each byte is accompanied by a byte number B on path 11, indicating the position of the byte within the field. Thus, the identifier I has B=0 and so on.

The input data is applied to a data selector circuit 12 whose function is to select a specified string of data bytes from each data field.

The selected strings of bytes are fed to a data transformation circuit 13 which transforms the data according to a many-to-one mapping scheme, to produce two 17-bit addresses on paths 14 and 15.

These addresses are applied to the address inputs of two random-access memories 16 and 17 (referred to herein as bit maps), each having 128K individually addressable bit locations. The addressed bit in each bit map can be set to "1" to store information in the maps. The addressed bits can also be read out and combined in an AND gate 18 to produce an output signal. The use of two bit maps in this way is described in the above-mentioned specifications and so will not be described further herein.

DATA SELECTOR CIRCUIT

The data selector circuit 12 includes a random access memory 20 having 256 locations, one for each possible value of the identifier byte I, each location containing a pointer P in the range 0–3. Each identifier byte I appearing on the path 10 addresses the memory 20, so as to read out one of these pointers.

The pointer P is applied to the address input of a random access memory 21 having four locations, each of which contains a start byte number START and a stop byte number STOP, indicating the positions of the beginning and end of a string of bytes. The start byte number read out of the memory 21 is compared, in comparator 22, with the input byte number B and, when equality is detected, sets bistable 23. Similarly, the stop byte number is compared, in comparator 24, with the input byte number B and, when equality is detected, resets the bistable 23. While it is set, the bistable 23 opens an AND gate 25, allowing the input data D to pass to the transformation circuit 13.

It should be noted that, if it is desired to select just a single byte from a particular field, this can be achieved by making the start and stop byte numbers equal in the appropriate location of the memory 21.

TRANSFORMATION CIRCUIT

The transformation circuit 13 includes a hash coding circuit 30 which receives the selected strings of data bytes from the data selector circuit 12 when the AND gate 25 is opened. The circuit 30 combines each data byte with a 7-bit hashing key K and with an 8-bit feedback signal F, to produce an 8-bit hashed result signal H. This signal H is stored in a result store 31, consisting of four 8-bit sections. The signal H can be switched into any one of these sections, by means of a distributor circuit 32.

The four sections of the result store 31 are connected to a multiplexer 33 which selects one of these sections to provide the feedback signal F. The bits F0–F7 of the feedback signal are thus derived from the respective bits H0–H7 of the hashed result signal.

At the end of each record, the contents of the result store 31 are transferred to a 32-bit buffer 34. The outputs of the buffer are connected to a hard-wired link network 35, which selects a first set of 17 bits from the buffer to provide the address for the first bit map 16, and at the same time selects a second, different set of 17 bits to provide the address for the second bit map 17.

The pointer P from the memory 20 is also used to address a random access memory 36 having four locations, each of which contains a result store position indicator R specifying one of the four sections of the result store 31. The output of the memory 36 is used to control the distributor circuit 32 so as to switch the signal H into the specified section of the result store, and is also used to control the multiplexer 33 so as to select the output of that section as the feedback signal F.

The indicator R is also applied to the address input of a random access memory 37 having four locations, each of which contains a prime number in the range 3–251. The contents of the addressed location of the memory 37 supply the hashing key K for the hash coding circuit 30.

In summary, it can be seen that the memory 20 assigns a pointer P for each value of the identifier byte I. This pointer selects start and stop byte numbers from the memory 21, and thus determines the position of the string of bytes to be selected from the data field. The pointer P also controls the selection of the hash key K from the memory 37, and the operation of the distributor circuit 32, and hence controls the way in which the selected string of bytes is transformed by the circuit 13 to produce the addresses for the bit maps.

All the random access memories 20, 21, 36 and 37 are alterable by any conventional memory writing technique. This allows the operations of the selection circuit 12 and transformation circuit 13 to be easily modified in a flexible manner.

It should be noted that it is possible to by-pass the hash coding circuit 30, by switching a multiplexer 39 so as to select the input data direct from the gate 25 instead of the signal H.

Hash Coding Circuit

Figure 2:
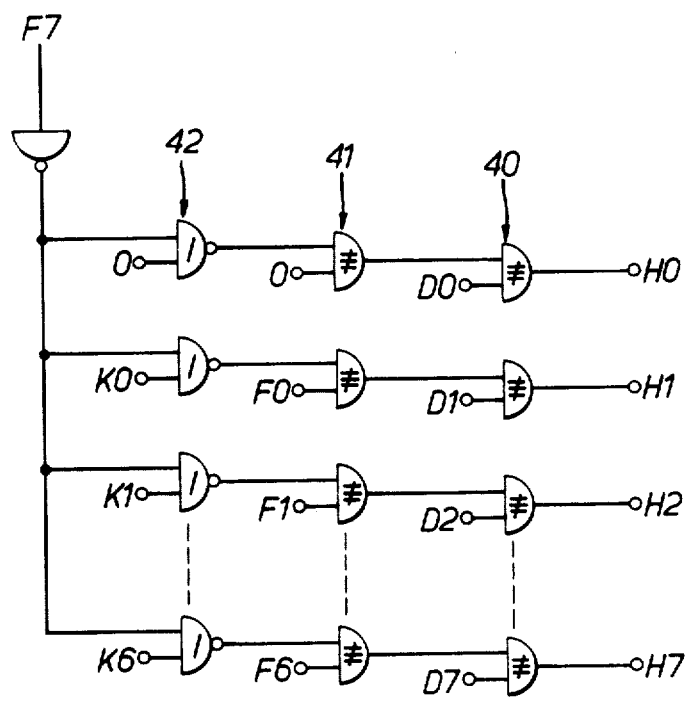
FIG. 2 is a circuit diagram of a hash-coding circuit forming part of the transformation circuit.

Referring to FIG. 2, the hash coding circuit 30 comprises a first set of exclusive-OR gates 40 which receive respective bits D0–D7 of the input data byte D. The outputs of these gates 40 provide the hashed result signal H0–H7. Other inputs of the gates 40 receive the outputs of a second set of exclusive-OR gates 41. The first of the gates 41 receives a "0" logic level signal, while the other seven receive the seven least significant bits F0–F6 of the feedback signal F. Other inputs of the gates 41 receive the outputs of a set of NOR gates 42. The first of the gates 42 receives a "0" logic level, while the other seven receive the hashing key K0–K6. A second input of each of the gates 42 receives the inverse of the most significant bit F7 of the feedback signal F.

It can be seen that the hash-coded output signal H is thus a function of the input data byte D, the hashing key K, and the feedback signal F from the current contents of the result register.

What is claimed is:

1. A data transformation circuit comprising:
   (a) input means for receiving aninput data value,
   (b) a hashing key memory for storing a plurality of values,
   (c) means connected to the hashing key memory for reading out one of said values to provide a hashing key,
   (d) a result register comprising a plurality of sections,
   (e) control means for producing a control signal identifying a selected one of the sections of the result register,
   (f) selection means, connected to the result register and responsive to said control signal to read out said selected one of the sections of the result register to provide a feedback value,
   (g) hashing means connected to receive said input data value from the input means, the hashing key from the hashing key memory and the feedback value from the selection means, for combining said input data value, hashing key and feedback value to produce a hash value, and
   (h) distribution means connected to receive said hash value from the hashing means and responsive to said control signal from the control means, for writing said hash value into said selected one of the sections of the result register.

2. A data transformation circuit according to claim 1 wherein said control means comprises means connected to said input means for deriving said control signal from said input data value.

* * * * *